US007293880B2

(12) United States Patent
Sakata et al.

(10) Patent No.: US 7,293,880 B2
(45) Date of Patent: Nov. 13, 2007

(54) LIGHT SOURCE INCLUDING MULTIPLE LIGHT EMITTING DEVICES DRIVEN BY A CONTROL DEVICE, AND PROJECTOR

(75) Inventors: Hidefumi Sakata, Tatsuno-cho (JP); Masatoshi Yonekubo, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 194 days.

(21) Appl. No.: 11/114,136

(22) Filed: Apr. 26, 2005

(65) Prior Publication Data

US 2005/0248733 A1 Nov. 10, 2005

(30) Foreign Application Priority Data

May 7, 2004 (JP) .............................. 2004-138559

(51) Int. Cl.
G03B 21/26 (2006.01)
G03B 21/00 (2006.01)
G02F 1/1335 (2006.01)
G02F 1/00 (2006.01)
H04N 5/70 (2006.01)

(52) U.S. Cl. ........................ 353/94; 353/33; 353/37; 349/8; 348/801; 348/751; 348/757; 362/612

(58) Field of Classification Search ................ 353/94, 353/31, 33, 37; 349/8; 348/801, 750, 751, 348/757; 362/612
See application file for complete search history.

(56) References Cited

U.S. PATENT DOCUMENTS 6,648,475 B1 11/2003 Roddy et al.
6,802,613 B2 * 10/2004 Agostinelli et al. ........... 353/31
7,029,129 B2 * 4/2006 Shimada ....................... 353/94
7,118,221 B2 * 10/2006 Shimada ....................... 353/31
2003/0214633 A1 * 11/2003 Roddy et al. ................. 353/31
2003/0234911 A1 12/2003 Horvath et al.
2004/0070736 A1 4/2004 Roddy et al.
2004/0263500 A1 12/2004 Sakata

FOREIGN PATENT DOCUMENTS

EP 1 365 598 11/2003
JP A 2001-042431 2/2001

* cited by examiner

Primary Examiner—W. B. Perkey
Assistant Examiner—Magda Cruz
(74) Attorney, Agent, or Firm—Oliff & Berridge, PLC

(57) ABSTRACT

Aspects of the invention can provide a light source that can reduce the optical system in size while enlarging a color reproducible range and achieving higher luminance. The system can include a cross dichroic prism to combine an R light, a $G_1$ light, a $G_2$ light, and a B light, and an LED R to generate the R light, an LED $G_1$ to generate the $G_1$ light, an LED $G_2$ to generate the $G_2$ light, and an LED B, disposed near the LED $G_2$ to be side by side, to generate the B light, as well as a control portion to drive these LED R, LED $G_1$, LED $G_2$, and LED B under control. The peak wavelengths of the $G_2$ light and the B light are adjacent to each other, and the control portion can drive the LED $G_2$ and the LED B under its control by switching in time division.

5 Claims, 11 Drawing Sheets

LIGHT SOURCE INCLUDING MULTIPLE LIGHT EMITTING DEVICES DRIVEN BY A CONTROL DEVICE, AND PROJECTOR

BACKGROUND

Aspects of the invention can relate to a light source and a projector. More particularly, the invention can have an object to provide a light source and a projector capable of reducing an optical system in size while enlarging a color reproducible range and achieving higher luminance.

There has been a need to increase luminance for a light source used in a projector. In order to satisfy this need, a method of increasing luminance by combining two lights each having a different wavelength using a dichroic mirror has been proposed in the related art. See, for example, JP-A-2001-42431. FIG. 13 is a plan view showing the configuration of a light source 100 in the related art. The light source 100 adopts the method of increasing luminance as described above, and is used, for example, in a projector.

Referring to FIG. 13, an LED 101R, an LED 101G$_1$, an LED 101G$_2$, and an LED 101B are provided in the vicinity of three sides of a cross dichroic prism 104 described below, and they are solid-state light-emitting devices to generate, respectively, a red light (hereinafter, referred to as an R light), a first green light (hereinafter, referred to as a G$_1$ light), a second green light (hereinafter, referred to as a G$_2$ light), and a blue light (hereinafter, referred to as a B light). As is shown in FIG. 14, the R light, the G$_1$ light, the G$_2$ light, and the B light have spectrums having different peak wavelengths λR, λG$_1$, λG$_2$, and λB, respectively. By using lights of four colors, including the R light, G$_1$ light, G$_2$ light, and B light, in this manner, a color reproducible range can be enlarged in comparison with a case using lights of three colors (RGB).

Referring to FIG. 13 again, a liquid crystal light valve 102R is provided in close proximity to the LED 101R, and it is a transmission liquid crystal display device to modulate the R light emitted from the LED 101R according to an image signal. In other words, a video responding to a color corresponding to the R light is formed in the liquid crystal light valve 102R and the R light is modulated when it passes through the liquid crystal light valve 102R.

A dichroic mirror 103 is provided at an angle such that it can allow the G$_1$ light emitted from the LED 101G$_1$ and the G$_2$ light emitted from the LED 101G$_2$ to come incident thereon at 45 degrees, and it is an optical device having an optical characteristic to transmit the G$_1$ light (peak wavelength: λG$_1$) while reflecting the G$_2$ light (peak wavelength: λG$_2$). In short, the dichroic mirror 103 is an optical device to combine the G$_1$ light and the G$_2$ light. The light source 100 in the related art combines the G$_1$ light and the G$_2$ light in the dichroic mirror 103 as has been described, and thereby achieves high luminance with a green light. A white light is formed by combining a red light, a green light, and a blue light in the ratio of 2:7:1. It is therefore necessary for the light source 100 to increase luminance of a green light than lights of the other colors, and in order to satisfy this need, high luminance is achieved with a green light by combining the G$_1$ light and the G$_2$ light in the dichroic mirror 103.

A liquid crystal light valve 102G can be provided in close proximity to the dichroic mirror 103, and it is a transmission liquid crystal display device to modulate a green light (hereinafter, referred to as a G$_1$G$_2$ light) combined in the dichroic mirror 103 according to an image signal. In other words, a video responding to a color of the G$_1$G$_2$ light is formed in the liquid crystal light valve 102G, and the G$_1$G$_2$ light is modulated when it passes through the liquid crystal light valve 102G. A liquid crystal light valve 102B is provided in close proximity to the LED 101B, and it is a transmission liquid crystal display device to modulate the B light emitted from the LED 101B according to an image signal. That is to say, a video responding to a color corresponding to the B light is formed in the liquid crystal light valve 102B, and the B light is modulated when it passes through the liquid crystal light valve 102B.

The cross dichroic prism 104 has two filters, including a dichroic filter 105 and a dichroic filter 106. These dichroic filter 105 and dichroic filter 106 are disposed to intersect with each other at right angles in the shape of a capital X. The dichroic filter 105 has a transmission characteristic indicated by a broken line in FIG. 14, and thereby transmits the G$_2$ light, the G$_1$ light, and the B light while reflecting the R light. The dichroic filter 106 has a transmission characteristic indicated by an alternate long and short dash line in FIG. 14, and thereby transmits the R light, the G$_1$ light, and the G$_2$ light while reflecting the B light. The cross dichroic mirror 104 shown in FIG. 13 is furnished with a function of combining the R light, the G$_1$G$_2$ light (G$_1$ light and G$_2$ light), and the B light as has been described. A projection lens 107 is a lens to project lights combined in the cross dichroic mirror 104 onto a screen (not shown).

SUMMARY

Incidentally, the light source 100 in the related art achieves high luminance with a green light by providing the dichroic mirror 103, the LED 101G$_1$, and the LED 101G$_2$ in close proximity to the liquid crystal light valve 102G as is shown in FIG. 13. This configuration, however, needs a large space to provide the dichroic mirror 103, the LED 101G$_1$, and the LED 101G$_2$, which raises a problem that the optical system is increased in size.

An object of the invention can be to provide a light source and a projector capable of reducing the optical system in size while enlarging a color reproducible range and achieving higher luminance.

In order to solve the foregoing problems and achieve the above and other objects, one aspect of the invention can include a light combining device for combining a first color light through a fourth color light that come incident from first through third optical paths, a first light emitting device, provided in the first optical path, for generating the first color light, a second light emitting device, provided in the second optical path, for generating the second color light, a third light emitting device, provided in the third optical path, for generating the third color light, a fourth light emitting device, provided in the third optical path near the third light emitting device to be side by side, for generating the fourth color light, and a control device for driving the first through fourth light emitting device under control. Of the first color light through the fourth color light, peak wavelengths of the third color light and the fourth color light are adjacent to each other, and the control device drives, under control, the third light emitting device and the fourth light emitting device by switching in time division.

According to this aspect of the invention, the light combining device for combining the first color light through the fourth color light, the first through fourth light emitting device, and the control device for driving the first through fourth light emitting device under control are provided. The third light emitting device and the fourth light emitting device are provided side by side, so that the peak wavelengths of the third color light and the fourth color light are adjacent to each other. The control device thereby drives, under its control, the third light emitting device and the fourth light emitting device by switching in time division. It is thus possible to reduce the optical system in size while enlarging the color reproducible range and achieving higher luminance.

Another aspect of the invention is characterized by further including first through third modulating device, provided, respectively, in the first through third optical paths on a light incident-side of the light combining device, for modulating the first color light through the fourth color light to correspond to videos of respective colors, wherein the control device drives, under control, the third modulating device in association with switching between the third light emitting device and the fourth light emitting device.

According to this aspect of the invention, the first through third modulating device for modulating the first color light through the fourth color light to correspond to videos of respective colors are provided, respectively, in the first through third optical paths on a light incident-side of the light combining device, and the control device drives, under control, the third modulating device in association with switching between the third light emitting device and the fourth light emitting device. It can thus be possible to reduce the optical system of a device displaying a video in size while enlarging the color reproducible range and achieving higher luminance.

Still another aspect of the invention can further include fifth light emitting device, provided in the first optical path near the first light emitting device to be side by side, for generating a fifth color light. Peak wavelengths of the first color light and the fifth color light can be adjacent to each other, and the control device drives, under control, the first light emitting device and the fifth light emitting device by switching in time division.

According to this aspect of the invention, the fifth light emitting device for generating the fifth color light can be provided in the first optical path near the first light emitting device to be side by side, so that the peak wavelengths of the first color light and the fifth color light are adjacent to each other. The control device thereby drives, under its control, the first light emitting device and the fifth light emitting device by switching in time division. It is thus possible to further reduce the optical system in size while enlarging the color reproducible range and achieving higher luminance.

Still another aspect of the invention can further include a first through third modulating device, provided, respectively, in the first through third optical paths on a light incident-side of the light combining device, for modulating the first color light through the fifth color light to correspond to videos of respective colors. The control device drives, under control, the first modulating device in association with switching between the first light emitting device and the fifth light emitting device, and drives, under control, the third modulating device in association with switching between the third light emitting device and the fourth light emitting device.

According to this aspect of the invention, a first through third modulating device for modulating the first color light through the fifth color light to correspond to videos of respective colors can be provided, respectively, in the first through third optical paths on a light incident-side of the light combining device, and the control device can drive, under control, the first modulating device in association with switching between the first light emitting device and the fifth light emitting device, and drives, under control, the third modulating device in association with switching between the third light emitting device and the fourth light emitting device. It is thus possible to further reduce the optical system of a device displaying a video in size while enlarging the color reproducible range and achieving higher luminance.

Still another aspect of the invention can provide a projector employing the light source according to any of the above aspects. According to this aspect of the invention, it is possible to reduce the optical system in size employed in the projector while enlarging the color reproducible range and achieving higher luminance.

BRIEF DESCRIPTION OF THE DRAWINGS

The invention will be described with reference to the accompanying drawings, wherein like numerals reference like elements, and wherein.

DETAILED DESCRIPTION OF EMBODIMENTS

Exemplary embodiments of a light device and a projector of the invention will now be described in detail with reference to the drawings. It should be appreciated, however, that the invention is not limited to the exemplary embodiments described below.

Figure 1:
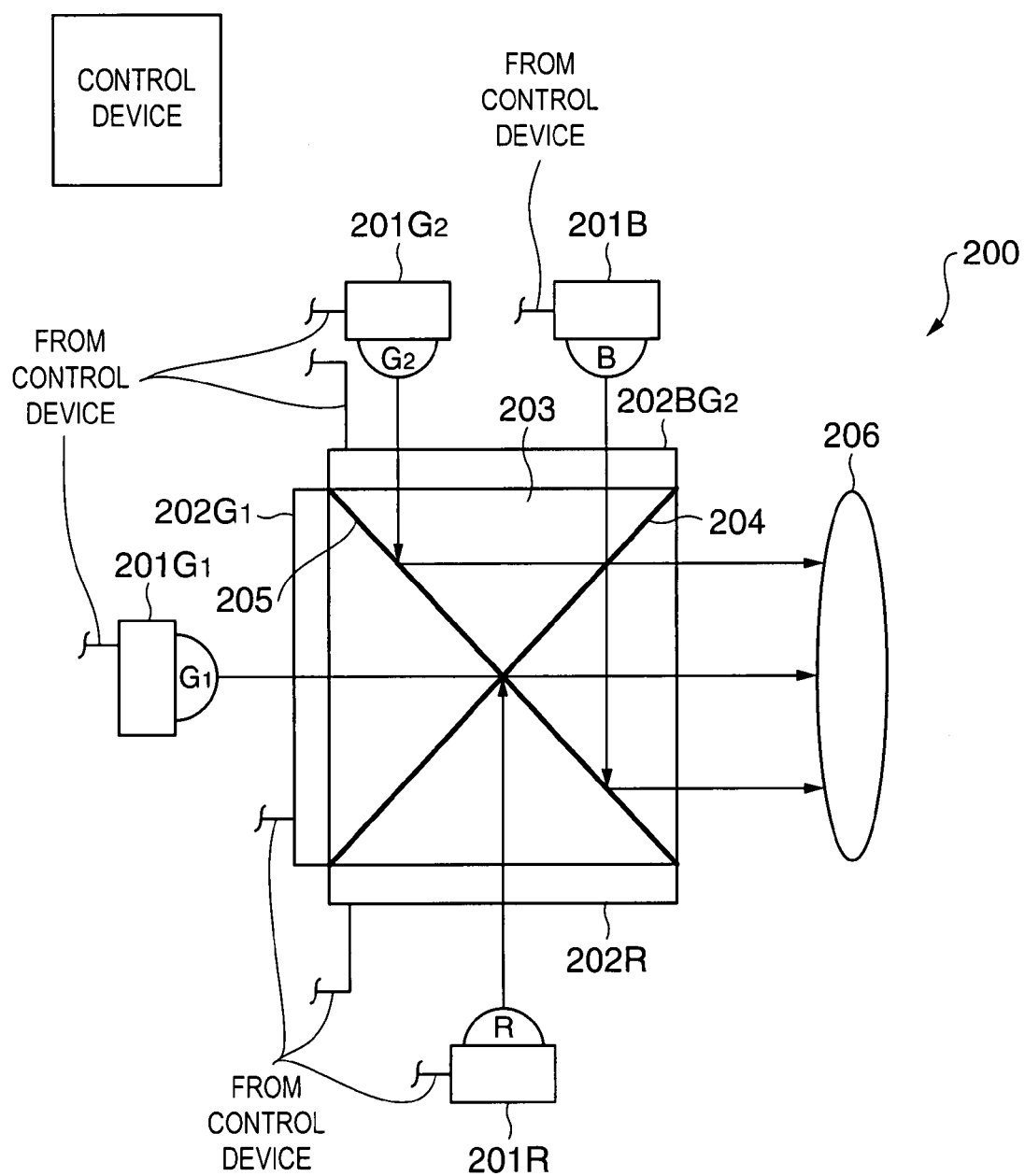
FIG. 1 is a plan view showing the configuration of a light source 200 according to a first exemplary embodiment of the invention.
Figure 2:
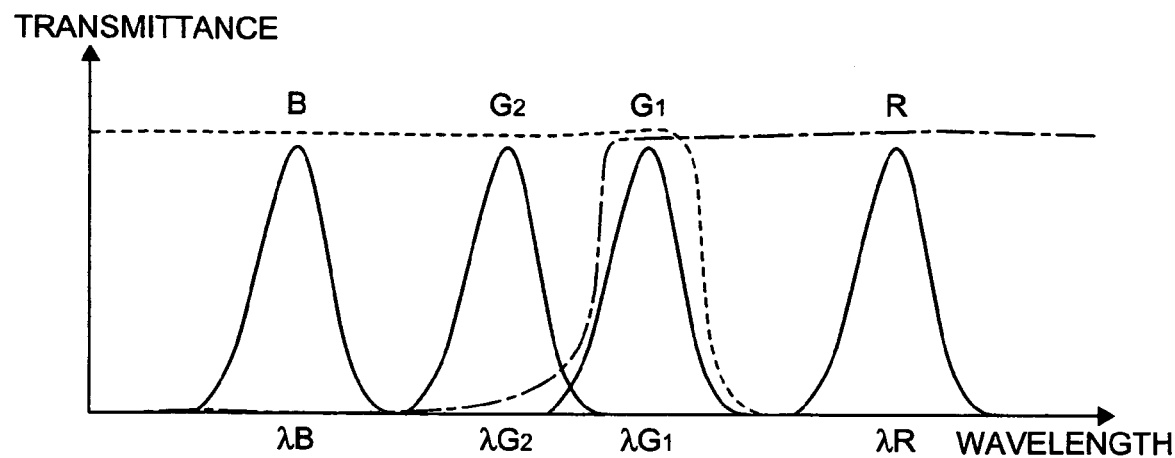
FIG. 2 is a view showing optical spectrums and transmission characteristics of the light source 200 shown in FIG. 1.

FIG. 1 is a plan view showing the configuration of a light source 200 according to a first exemplary embodiment of the invention. The light source 200 is used, for example, in a projector. In the light source 200, an LED 201R, an LED 201$G_1$, an LED 201$G_2$, and an LED 201B are provided in the vicinity of three sides of a cross dichroic prism 203 described below, and they are solid-state light-emitting devices to generate, respectively, a red light (hereinafter, referred to as an R light), a first green light (hereinafter, referred to as a $G_1$ light), a second green light (hereinafter, referred to as a $G_2$ light), and a blue light (hereinafter, referred to as a B light). As is shown in FIG. 2, the R light, $G_1$ light, $G_2$ light, and B light have spectrums having different peak wavelengths $\lambda R$, $\lambda G_1$, $\lambda G_2$, and $\lambda B$, respectively.

Figure 3:
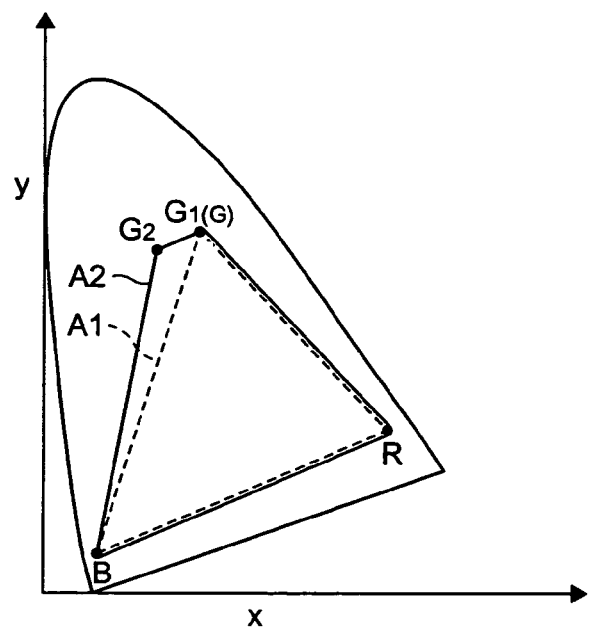
FIG. 3 is an x-y chromaticity diagram in the first exemplary embodiment.

By using lights of four colors, including the R light, the $G_1$ light, the $G_2$ light, and the B light, in this manner, as is shown in an x-y chromaticity diagram in FIG. 3, a color reproducible range (see a color range A2) can be enlarged in comparison with a case using lights of three colors (RGB) (see color range A1.

The LED 201R can be provided in close proximity to a liquid crystal light valve 202R. The liquid crystal light valve 202R is a transmission liquid crystal display device to modulate the R light emitted from the LED 201R according to an image signal. That is to say, a video responding to a color corresponding to the R light is formed in the liquid crystal light valve 202R and the R light is modulated when it passes through the liquid crystal light valve 202R.

The LED $201G_1$ can be provided in close proximity to a liquid crystal light valve $202G_1$. The liquid crystal light valve $202G_1$ is a transmission liquid crystal display device to modulate the $G_1$ light emitted from the LED $201G_1$ according to an image signal. That is to say, a video responding to a color of the $G_1$ light is formed in the liquid crystal light valve $202G_1$, and the $G_1$ light is modulated when it passes through the liquid crystal light valve $202G_1$.

The LED $201G_2$ and the LED 201B can be provided side by side in close proximity to a liquid crystal light valve $202BG_2$. The $G_2$ light and the B light are emitted, respectively, from the LED $201G_2$ and the LED 201B alternately in time division toward a liquid crystal light valve $202BG_2$. The liquid crystal light valve $202BG_2$ is a transmission liquid crystal display device furnished with a function of modulating the $G_2$ light emitted from the LED $201G_2$ according to an image signal and a function of modulating the B light emitted from the LED 201B according to an image signal. In other words, a video responding to a color corresponding to the $G_2$ light and a video responding to a color corresponding to the B light are formed alternately in time division in the liquid crystal light valve $202BG_2$.

The cross dichroic prism 203 has two filters, including a dichroic filter 204 and a dichroic filter 205. These dichroic filter 204 and dichroic filter 205 are disposed to intersect with each other at right angles in the shape of a capital X. The dichroic filter 204 has a transmission characteristic indicated by a broken line in FIG. 2, and thereby transmits the $G_1$ light, the $G_2$ light, and the B light while reflecting the R light. The dichroic filter 205 has a transmission characteristic indicated by an alternate long and short dash line in FIG. 2, and thereby transmits the R light and the $G_1$ light while reflecting the $G_2$ light the B light. The cross dichroic mirror 203 shown in FIG. 1 is furnished with a function of combining the R light, the $G_1$ light, the $G_2$ light, and the B light as has been described. A projection lens 206 is a lens to project lights combined in the cross dichroic mirror 203 onto a screen (not shown).

Figure 4:
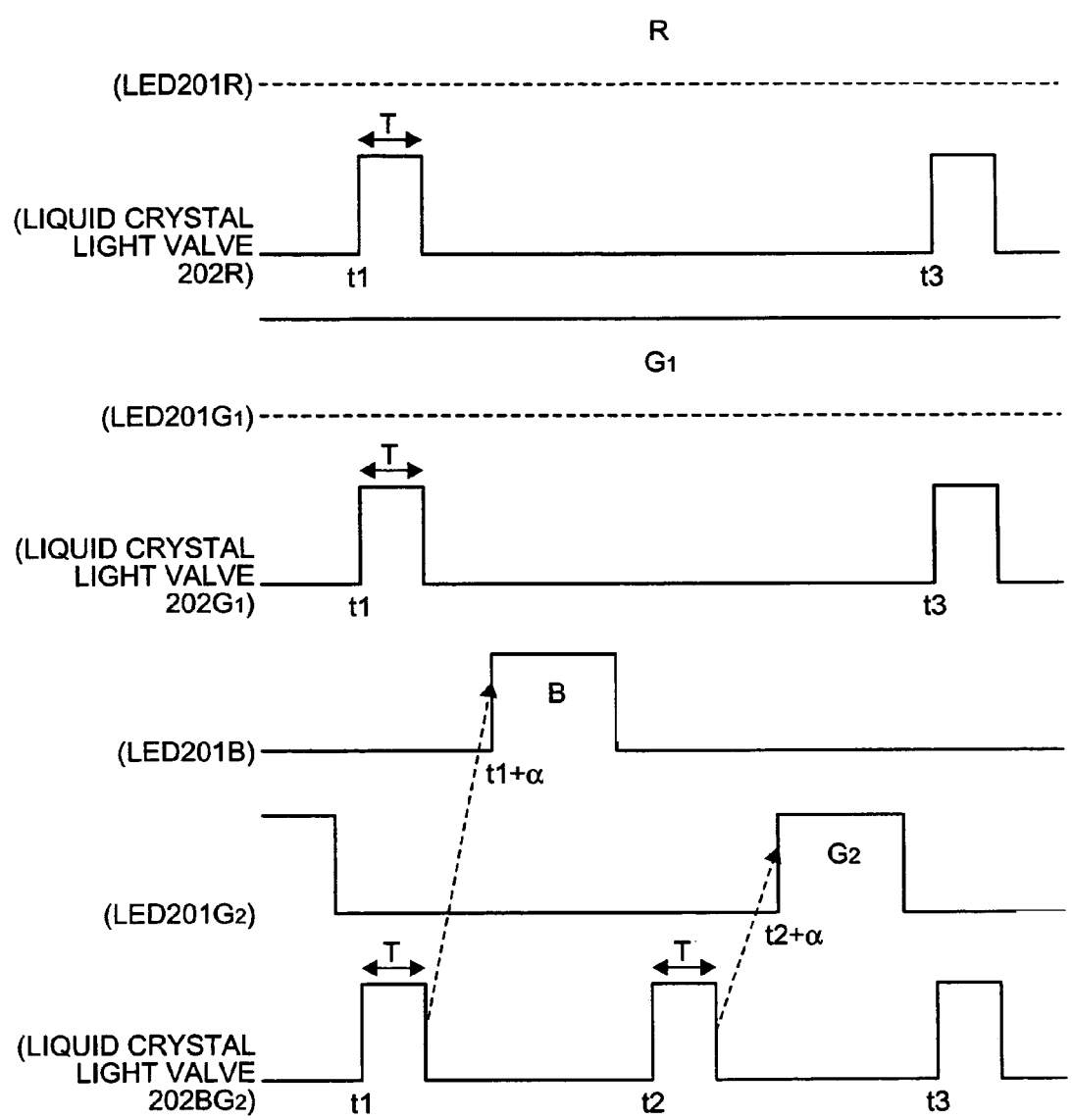
FIG. 4 is a view showing driving control timings in the first exemplary embodiment.

In the configuration describe above, a control portion (not shown) drives, under its control, the LED 201R, the liquid crystal light valve 202R, the LED $201G_1$, the liquid crystal light valve $202G_1$, the LED 201B, the LED $201G_2$, and the liquid crystal light valve $202BG_2$ independently at timings shown in FIG. 4. To be more specific, the LED 201R and the LED $201G_1$ are driven constantly under the control of the control portion. The R light and the $G_1$ light are thereby emitted constantly, respectively, from the LED 201R and the LED 201 $G_1$ shown in FIG. 1. Both the liquid crystal light valve 202R and the liquid crystal light valve $202G_1$ are driven at a time t1 and a time t3 shown in FIG. 4 under the control of the control portion, and modulate the R light and the $G_1$ light, respectively.

Writing times T referred to herein are times needed for the writing from the first line to the last line by the line-sequential writing method using the liquid crystal light valve 202R, the liquid crystal light valve $202G_1$, and the liquid crystal light valve $202BG_2$.

Meanwhile, the LED 201B and the LED $201G_2$ are driven alternately in time division under the control of the control portion. To be more specific, the liquid crystal light valve $202BG_2$ is driven at a time t1, a time t2, and a time t3, and modulates the B light and the $G_2$ light alternately. The LED 201B is driven at a time t1+$\alpha$ after the writing of all the lines is completed by driving the liquid crystal light valve $202BG_2$ at a time t1. Meanwhile, the LED $201G_2$ is driven at a time t2+$\alpha$ after the writing of all the lines is completed by driving the liquid crystal light valve $202BG_2$ at a time t2.

The R light, the $G_1$ light, the $G_2$ light, and the B light are combined in the cross dichroic prism 203 by the control at the timings specified above, and the lights thus combined are projected on a screen (not shown) by a projection lens 206.

As has been described, according to the first exemplary embodiment, the cross dichroic prism 203 to combine the R light, the $G_1$ light, the $G_2$ light, and the B light, and the LED 201R, the LED $201G_1$, the LED $201G_2$, and the LED 201B, as well as the control portion (not shown) to drive these LED 201R, LED $201G_1$, LED $201G_2$, and LED 201B under control are provided. Then, the LED $201G_2$ and the LED 201B are provided side by side, so that, as is shown in FIG. 2, the peak wavelengths of the $G_2$ light and the B light are adjacent to each other. This exemplary configuration enables the control portion to drive the LED $201G_2$ and the LED 201B under its control by switching in time division. It is thus possible to reduce the optical system in size while enlarging the color reproducible region and achieving higher luminance.

Also, according to the first exemplary embodiment, the liquid crystal light valve 202R, the liquid crystal light valve $202G_1$, and the liquid crystal light valve $202BG_2$ to modulate, respectively, the R light, the $G_1$ light, and the $G_2$ light and the B light to correspond to videos of respective colors are provided on the light incident-side of the cross dichroic prism 203, and the control portion drives, under its control, the liquid crystal light valve $202BG_2$ in association with the switching between the LED $201G_2$ and the LED 201B. It can thus be possible to reduce the optical system of a projector displaying a video in size while further enlarging the color reproducible range and achieving higher luminance.

While the first exemplary embodiment has been described by way of an example of the configuration using lights of four colors, including the R light, the $G_1$ light, the $G_2$ light, and the B light, the invention may have a configuration using lights of five colors including a third green light (hereinafter, referred to as the $G_3$ light) in addition to lights of four colors specified above. An example of this configuration will now be described as a second exemplary embodiment.

Figure 5:
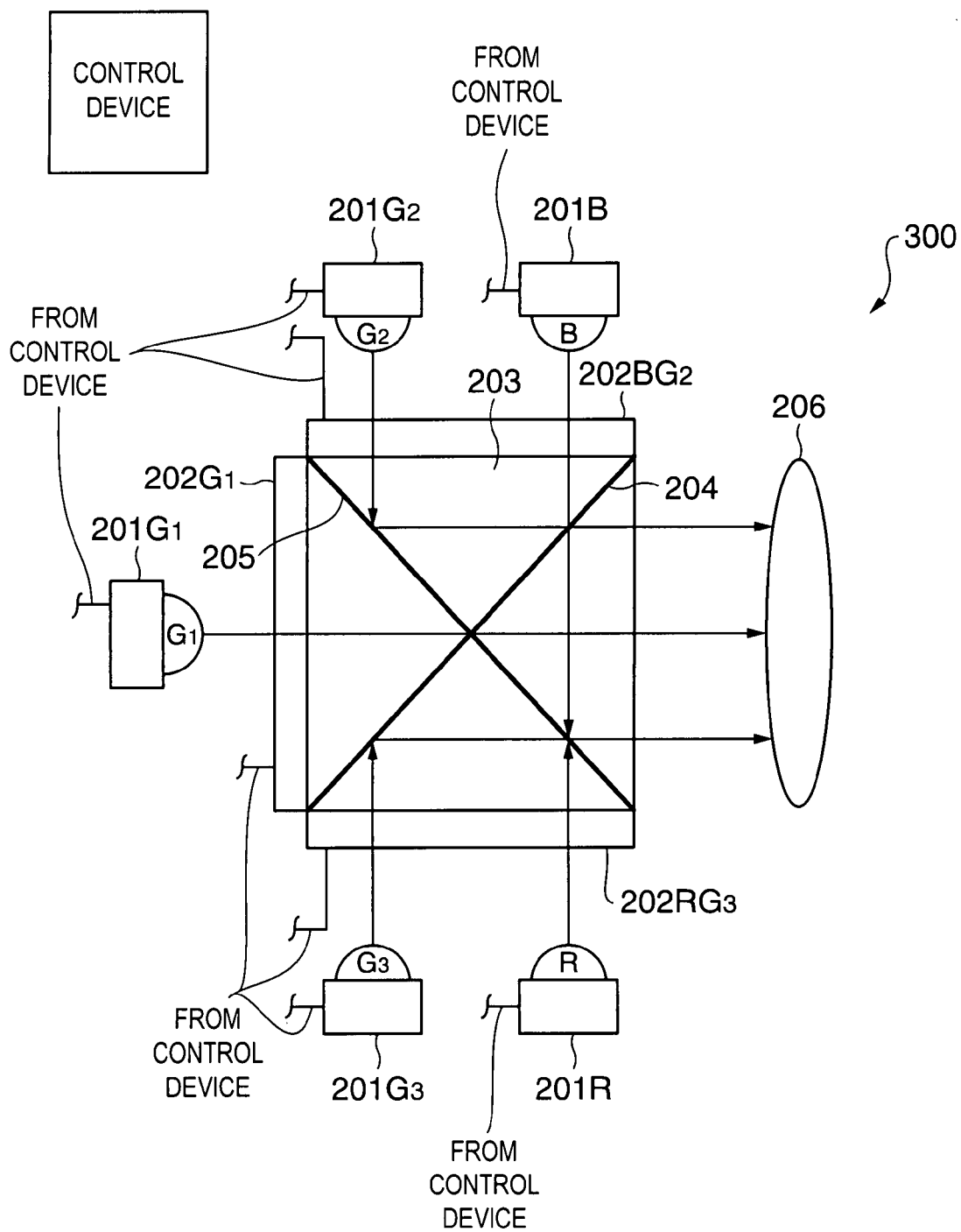
FIG. 5 is a plan view showing the configuration of a light source 300 according to a second exemplary embodiment of the invention.
Figure 6:
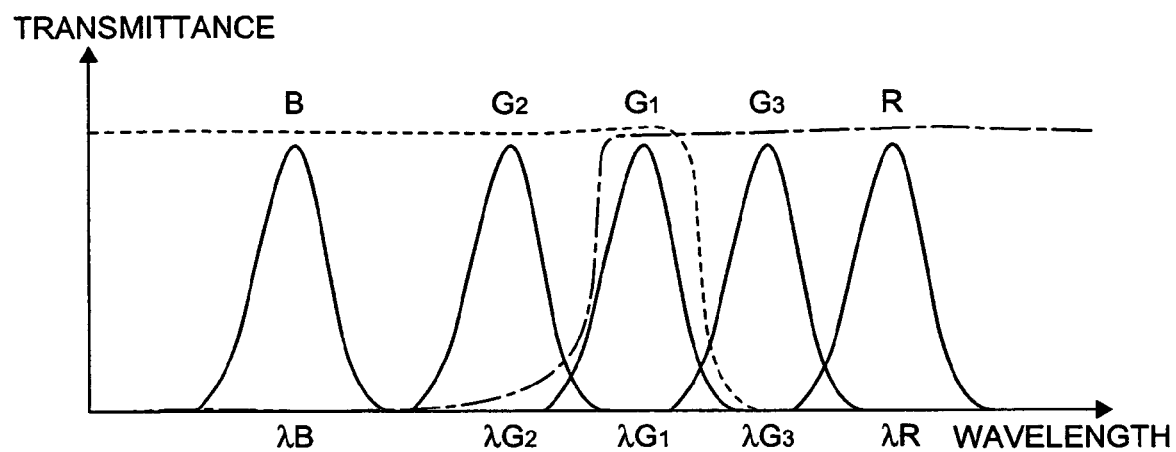
FIG. 6 is a view showing optical spectrums and transmission characteristics of the light source 300 shown in FIG. 5.

FIG. 5 is a plan view showing the configuration of a light source 300 according to the second exemplary embodiment of the invention. The light source 300 is used, for example, in a projector. In this drawing, like components are labeled with like reference numerals with respect to FIG. 1. In the light source 300 shown in FIG. 5, an LED $201G_3$ is additionally provided, and the liquid crystal light valve 202R shown in FIG. 1 is replaced with a liquid crystal light valve 202RG$_3$. The LED 201G$_3$ is a solid-state light-emitting device to generate the G$_3$ light. As is shown in FIG. 6, the R light, the G$_1$ light, the G$_2$ light, the G$_3$ light, and the B light have spectrums having different peak wavelengths λR, λG$_1$, λG$_2$, λG$_3$, and λB. In other words, the wavelength of the G$_3$ light is longer than the wavelength of the G$_1$ light and shorter than the wavelength of the R light.

Figure 7:
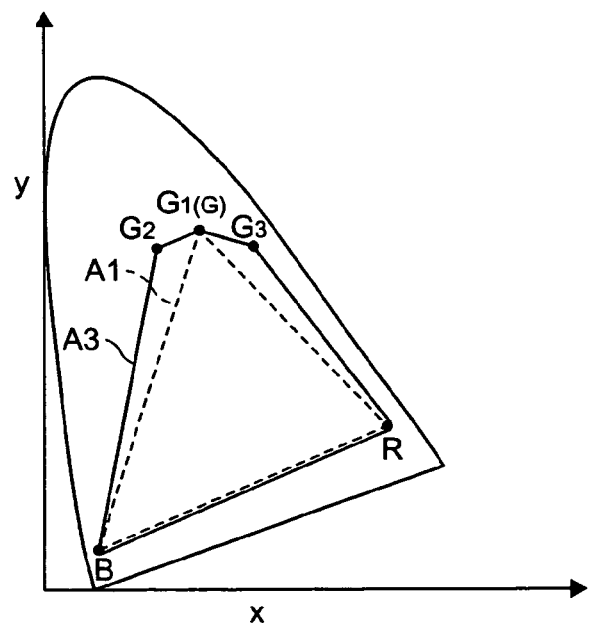
FIG. 7 is an x-y chromaticity diagram in the second exemplary embodiment.

By using lights of five colors, including the R light, the G$_1$ light, the G$_2$ light, the G$_3$ light, and the B light, in this manner, as is shown in an x-y chromaticity diagram in FIG. 7, a color reproducible range (see a color range A3) can be further enlarged in comparison with a case using lights of three colors (RGB) (see color range A1).

Referring to FIG. 5 again, the LED 201G$_3$ can be provided near the LED 201R to be side by side, and is also provided in close proximity to the liquid crystal light valve 202RG$_3$. The G$_3$ light and the R light are emitted, respectively, from the LED 201G$_3$ and the LED 201R alternately in time division toward the liquid crystal light valve 202RG$_3$. The liquid crystal light valve 202RG$_3$ is a transmission liquid crystal display device furnished with a function of modulating the G$_3$ light emitted from the LED 201 G$_3$ according to an image signal and a function of modulating the R light emitted from the LED 201R according to an image signal. In other words, a video responding to a color corresponding to the G$_3$ light and a video responding to a color corresponding to the R light are formed alternately in time division in the liquid crystal light valve 202RBG$_3$.

In the second exemplary embodiment, the dichroic filter 204 has a transmission characteristic indicated by a broken line in FIG. 6, and thereby transmits the G$_1$ light, the G$_2$ light, and the B light while reflecting the G$_3$ light and the R light. The dichroic filter 205 has a transmission characteristic indicated by an alternate long and short dash line in FIG. 6, and thereby transmits the R light, the G$_3$ light, and the G$_1$ light while reflecting the G$_2$ light and the B light.

Figure 8:
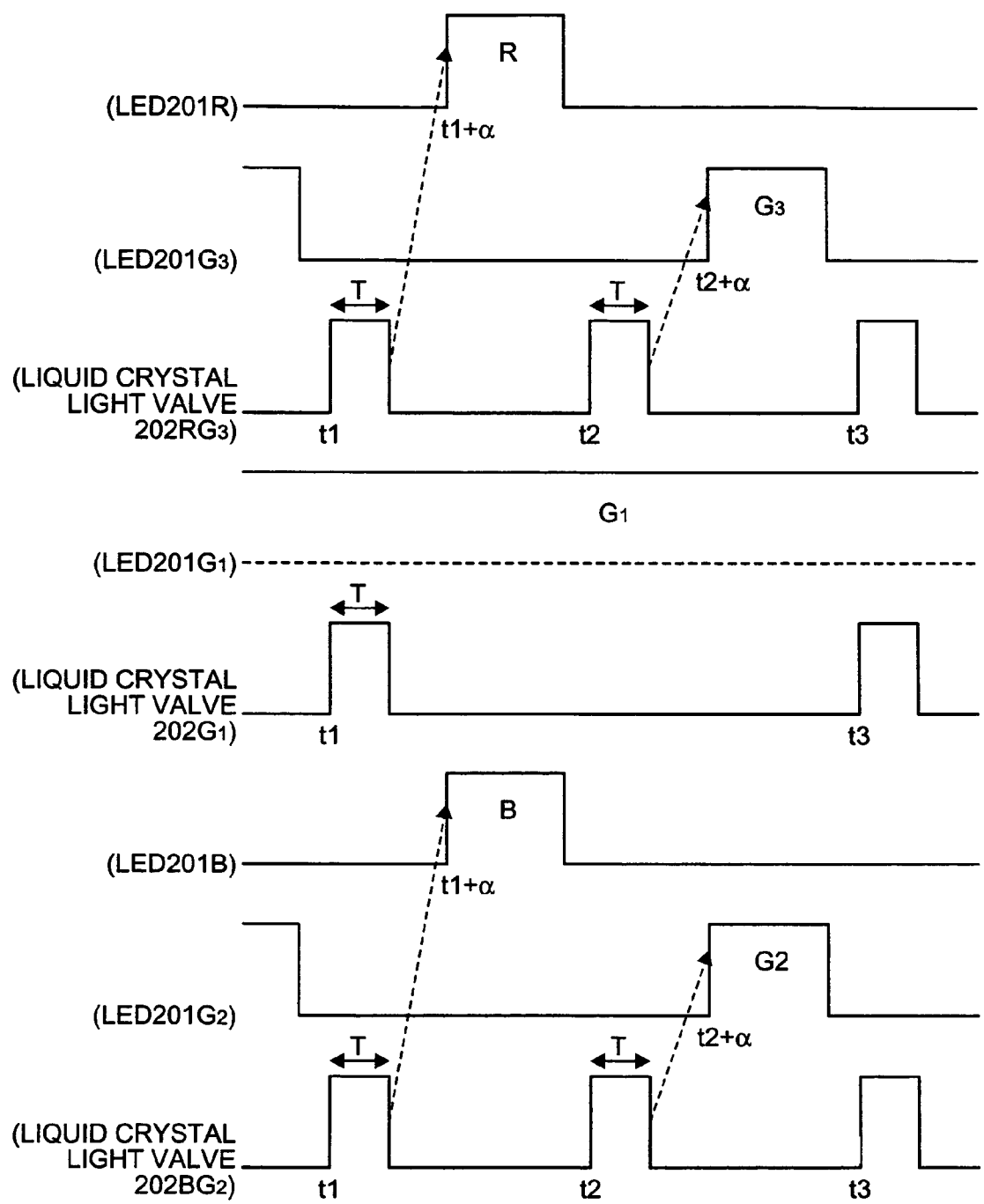
FIG. 8 is a view showing driving control timings in the second exemplary embodiment.

In the configuration describe above, a control portion (not shown) drives, under its control, the LED 201R, the LED 201G$_3$, the liquid crystal light valve 202RG$_3$, the LED 201G$_1$, the liquid crystal light valve 202G$_1$, the LED 201B, the LED 201G$_2$, and the liquid crystal light valve 202BG$_2$ independently at timings shown in FIG. 8. To be more specific, the LED 201G$_1$ is driven constantly under the control of the control portion. The G$_1$ light is thereby emitted constantly from the LED 201G$_1$ shown in FIG. 5. The liquid crystal light valve 202G$_1$ is driven at a time t1 and a time t3 shown in FIG. 8 under the control of the control portion, and modulates the G$_1$ light.

Writing times T referred to herein are times needed for the writing from the first line to the last line by the line-sequential writing method using the liquid crystal light valve 202RG$_3$, the liquid crystal light valve 202G$_1$, and the liquid crystal light valve 202BG$_2$.

The LED 201R and the LED 201G$_3$ are driven alternately in time division under the control of the control portion. To be more specific, the liquid crystal light valve 202RG$_3$ is driven at a time t1, a time t2, and a time t3, and modulates the R light and the G$_3$ light alternately. The LED 201R is driven at a time t1+α after the writing of all the lines is completed by driving the liquid crystal light valve 202RG$_3$ at a time t1. Meanwhile, the LED 201G$_3$ is driven at a time t2+α after the writing of all the lines is completed by driving the liquid crystal light valve 202RG$_3$ at a time t2.

The LED 201B and the LED 201G$_2$ are driven alternately in time division under the control of the control portion. To be more specific, the liquid crystal light valve 202BG$_2$ is driven at a time t1, a time t2, and a time t3, and modulates the B light and the G$_2$ light alternately. The LED 201B is driven at a time t1+α after the writing of all the lines is completed by driving the liquid crystal light valve 202BG$_2$ at a time t1. Meanwhile, the LED 201G$_2$ is driven at a time t2+α after the writing of all the lines is completed by driving the liquid crystal light valve 202BG$_2$ at a time t2.

The R light, the G$_1$ light, the G$_2$ light, the G$_3$ light, and the B light are combined in the cross dichroic prism 203 by the control at the timings specified above, and the lights thus combined are projected on the screen (not shown) by the projection lens 206.

As has been described, according to the second exemplary embodiment, the LED 201G$_3$, disposed near the LED 201R to be side by side, to generate the G$_3$ light is provided, so that, as is shown in FIG. 6, the peak wavelengths of the R light and the G$_3$ light are adjacent to each other. This configuration enables the control portion to drive the LED 201R and the LED 201G$_3$ by switching in time division under its control. It is thus possible to further reduce the optical system in size while enlarging the color reproducible range and achieving higher luminance.

Also, according to the second exemplary embodiment, the liquid crystal light valve 202RG$_3$ is provided, and the control portion drives, under its control, the liquid crystal light valve 202RG$_3$ in association with the switching between the LED 201R and the LED 201G$_3$. It can thus be possible to further reduce the optical system of a projector displaying a video in size while further enlarging the color reproducible range and achieving higher luminance.

While the second exemplary embodiment has been described by way of an example of the configuration using lights of five colors, including the R light, the G$_1$ light, the G$_2$ light, the G$_3$ light, and the B light, the invention may have a configuration using lights of four colors excluding the G$_2$ light from lights of five colors specified above. An example of this configuration will now be described as a third exemplary embodiment.

Figure 9:
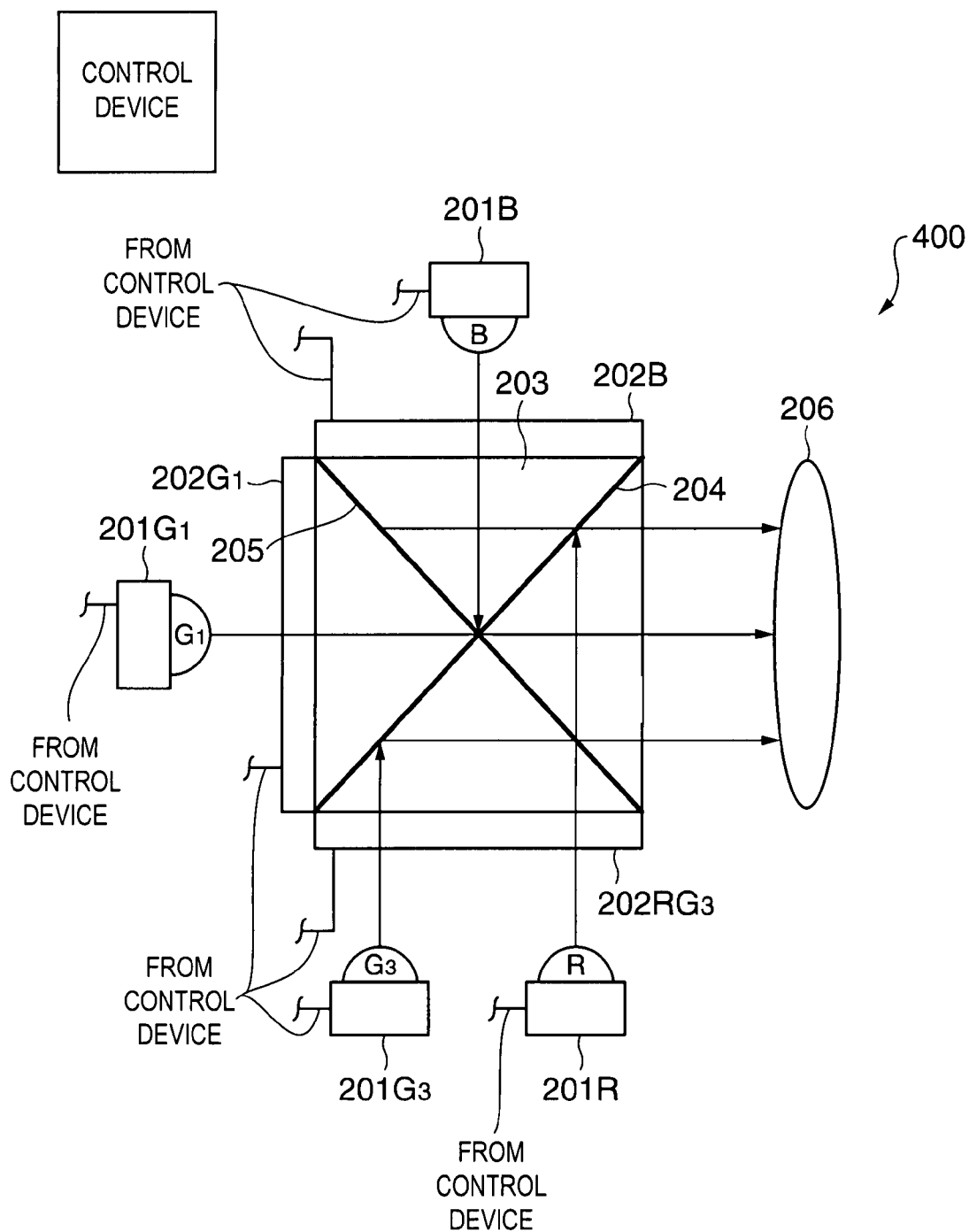
FIG. 9 is a plan view showing the configuration of a light source 400 according to a third exemplary embodiment of the invention.

FIG. 9 is a plan view showing the configuration of a light source 400 according to the third exemplary embodiment of the invention. The light source 400 is used, for example, in a projector. In this drawing, like components are labeled with like reference numerals with respect to FIG. 5 and FIG. 1. In the light source 400 shown in FIG. 9, the LED 201G$_2$ shown in FIG. 5 is omitted, and the liquid crystal light valve 202BG$_2$ shown in FIG. 5 is replaced with a liquid crystal light valve 202B. The light valve 202B is provided in close proximity to the LED 201B, and it is a transmission liquid crystal display device to modulate the B light emitted from the LED 201B according to an image signal. In other words, a video responding to a color corresponding to the B light is formed in the liquid crystal light valve 202B, and the B light is modulated when it passes through the liquid crystal light valve 202B.

Figure 11:
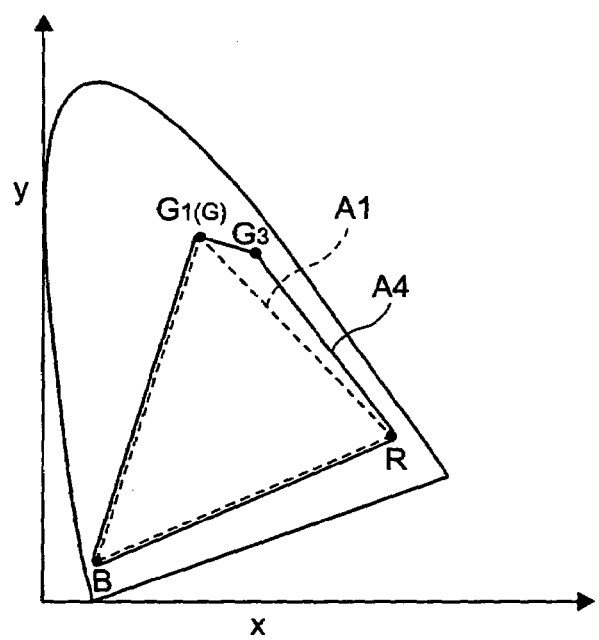
FIG. 11 is an x-y chromaticity diagram in the third exemplary embodiment.

In the third exemplary embodiment, by using lights of four colors, including the R light, the G$_1$ light, the G$_3$ light, and the B light, in this manner, as is shown in an x-y chromaticity diagram in FIG. 11, a color reproducible range (see a color range A4) can be enlarged in comparison with a case using lights of three colors (RGB) (see color range A1).

Figure 10:
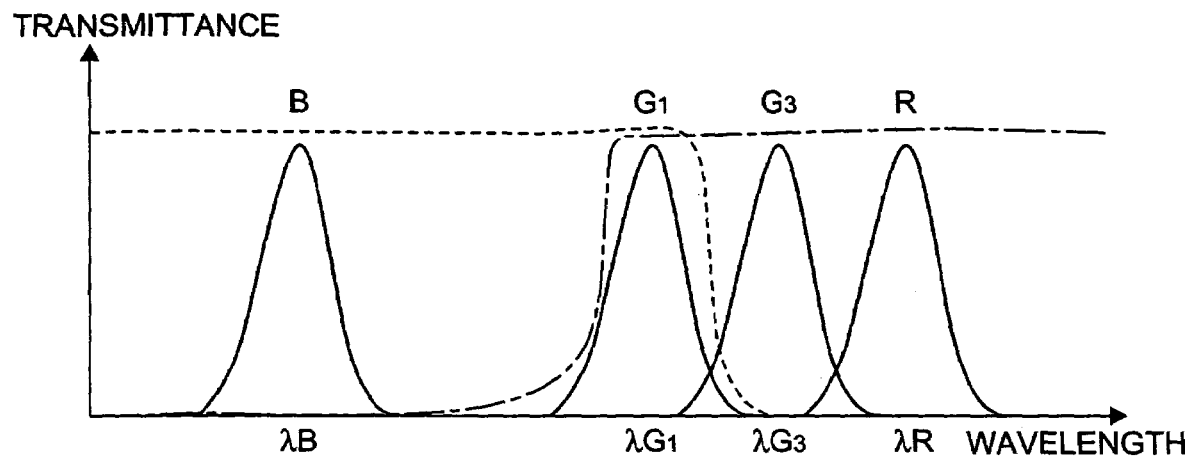
FIG. 10 is a view showing optical spectrums and transmission characteristics of the light source 400 shown in FIG. 9.

In the third exemplary embodiment, the dichroic filter 204 has a transmission characteristic indicated by a broken line in FIG. 10, and thereby transmits the G$_1$ light and the B light while reflecting the G$_3$ light and the R light. The dichroic filter 205 has a transmission characteristic indicated by an alternate long and short dash line in FIG. 10 and thereby transmits the R light, the $G_3$ light, and the $G_1$ light while reflecting the B light.

Figure 12:
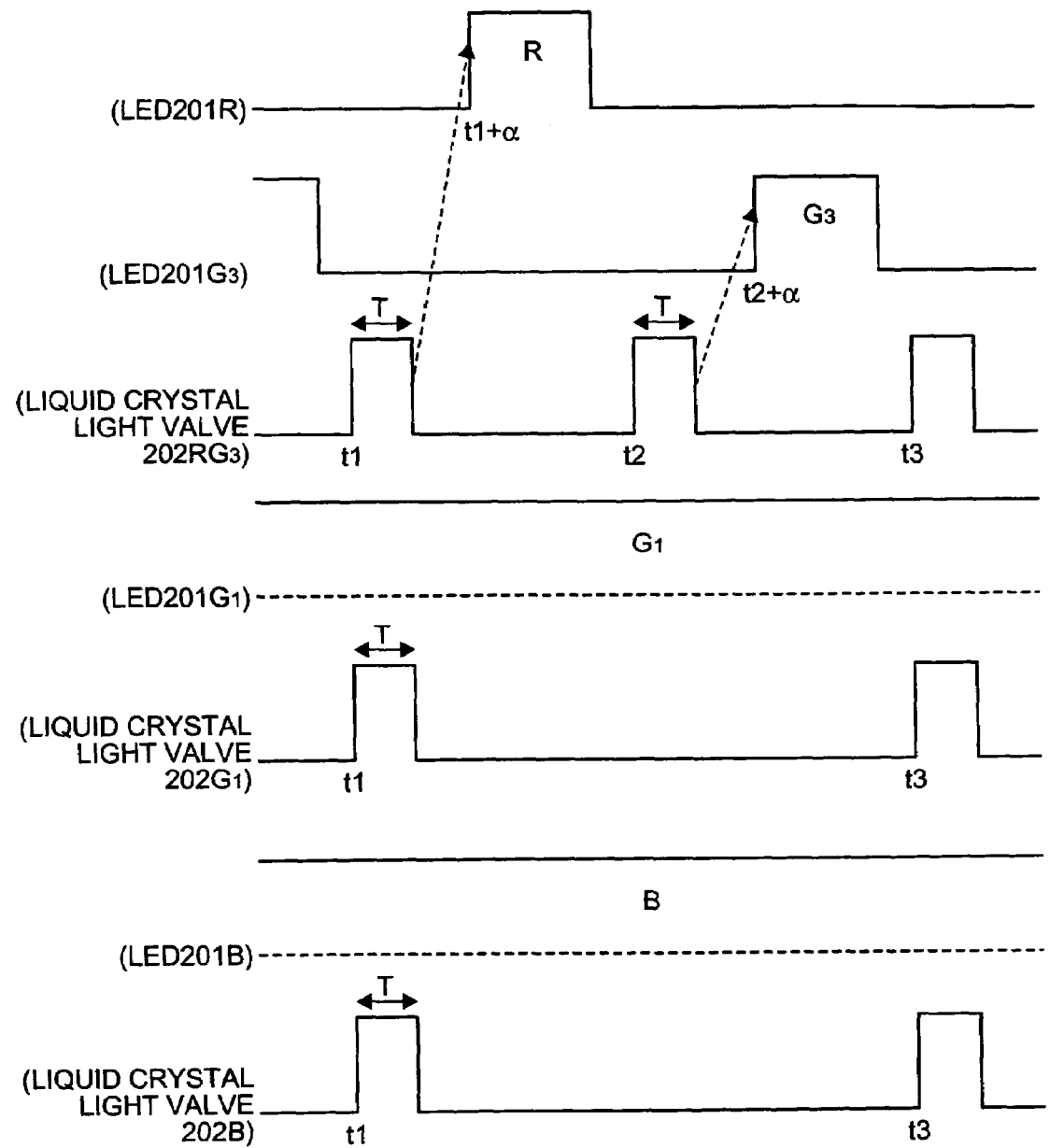
FIG. 12 is a view showing driving control timings in the third exemplary embodiment.
Figure 13:
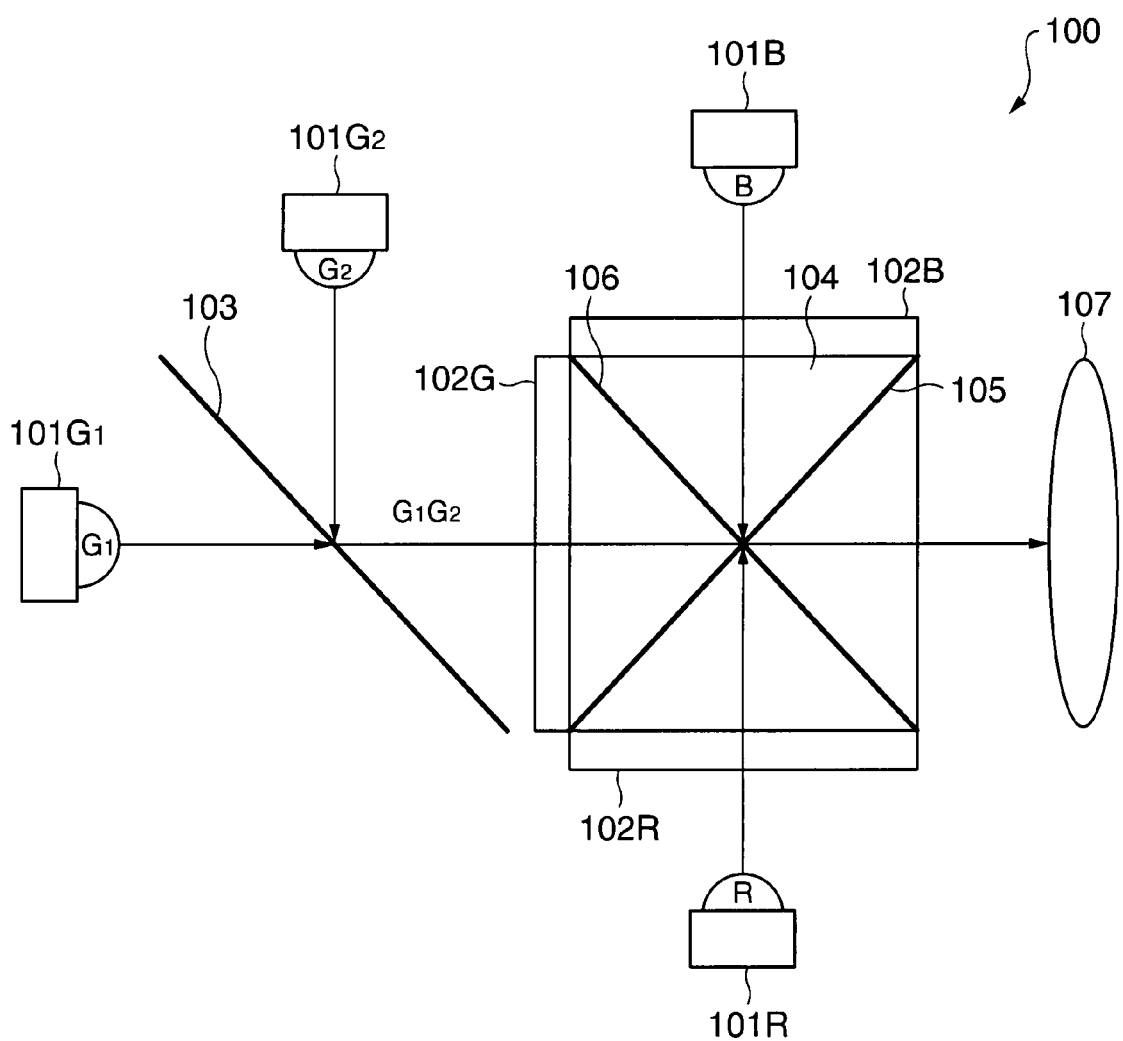
FIG. 13 is a plan view showing the configuration of a light source 100 in the related art.
Figure 14:
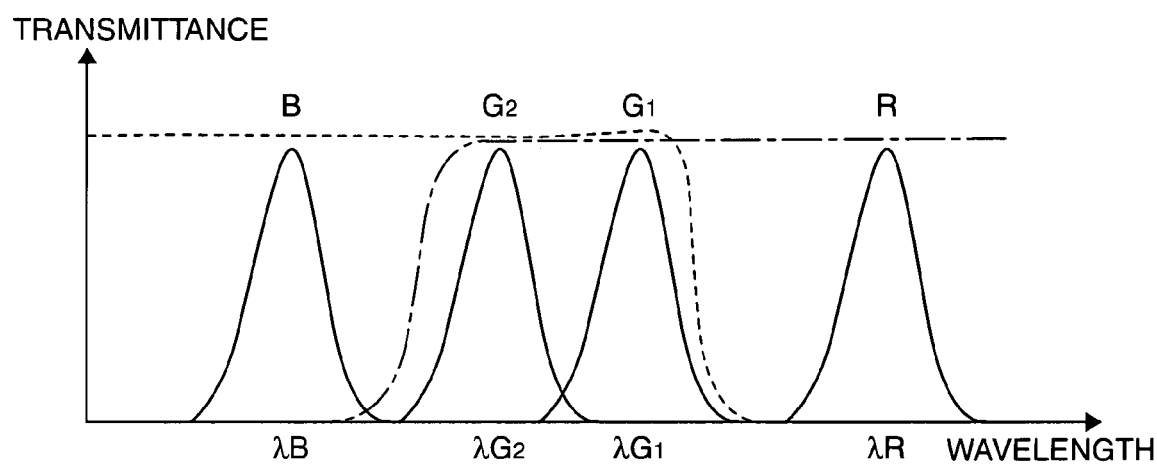
FIG. 14 is a view showing optical spectrums and transmission characteristics of the light source 100 shown in FIG. 13.

In the configuration describe above, a control portion (not shown) drives, under its control, the LED 201R, the LED 201G$_3$, the liquid crystal light valve 202RG$_3$, the LED 201G$_1$, the liquid crystal light valve 202G$_1$, the LED 201B, and the liquid crystal light valve 202B independently at timings shown in FIG. 12. To be more specific, the LED 201G$_1$ and the LED 201B are driven constantly under the control of the control portion. The $G_1$ light and the B light are thereby emitted constantly, respectively, from the LED 201G$_1$ and the LED 201B shown in FIG. 9. Both the liquid crystal light valve 202G$_1$ and the liquid crystal light valve 202B are driven at a time t1 and a time t3 shown in FIG. 12 under the control of the control portion, and modulate the $G_1$ light and the B light, respectively.

Writing times T referred to herein are times needed for the writing from the first line to the last line by the line-sequential writing method using the liquid crystal light valve 202RG$_3$, the liquid crystal light valve 202G$_1$, and the liquid crystal light valve 202B.

The LED 201R and the LED 201G$_3$ are driven alternately in time division under the control of the control portion. To be more specific, the liquid crystal light valve 202RG$_3$ is driven at a time t1, a time t2, and a time t3, and modulates the R light and the $G_3$ light alternately. The LED 201R is driven at a time t1+α after the writing of all the lines is completed by driving the liquid crystal light valve 202RG$_3$ at a time t1. Meanwhile, the LED 201G$_3$ is driven at a time t2+α. after the writing of all the lines is completed by driving the liquid crystal light valve 202RG$_3$ at a time t2.

The R light, the $G_1$ light, the $G_3$ light, and the B light are combined in the cross dichroic prism 203 by the control at the timings specified above, and the lights thus combined are projected on the screen (not shown) by the projection lens 206.

As has been described, according to the third exemplary embodiment, the same advantages as those of the first embodiment can be achieved.

As has been described, the light source and the projector of the invention are useful to reduce the optical system in size while enlarging the color reproducible range and achieving higher luminance.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A light source, comprising:
   a light combining device that combines a first color light through a fourth color light that are incident from a first through third optical path;
   a first light emitting device, provided in the first optical path, that generates the first color light;
   a second light emitting device, provided in the second optical path, that generates the second color light;
   a third light emitting device, provided in the third optical path, that generates the third color light;
   a fourth light emitting device, provided in the third optical path near the third light emitting device to be side by side, that generates the fourth color light;
   a control device that drives the first through fourth light emitting device under control; and
   of the first color light through the fourth color light, peak wavelengths of the third color light and the fourth color light being adjacent to each other, and the control device driving, under control, the third light emitting device and the fourth light emitting device by switching in time division.

2. The light source according to claim 1, further comprising:
   a first through third modulating device provided, respectively, in the first through third optical paths on a light incident-side of the light combining device that modulate the first color light through the fourth color light to correspond to videos of respective colors; and
   the control device driving, under control, the third modulating device in association with switching between said third light emitting device and the fourth light emitting device.

3. The light source according to claim 1, further comprising:
   a fifth light emitting device, provided in the first optical path near the first light emitting device to be side by side, that generates a fifth color light, and
   peak wavelengths of the first color light and the fifth color light being adjacent to each other, and the control device driving, under control, the first light emitting device and the fifth light emitting device by switching in time division.

4. The light source according to claim 3, further comprising:
   a first through third modulating device provided, respectively, in the first through third optical paths on a light-incident side of the light combining device that modulates the first color light through the fifth color light to correspond to videos of respective colors; and
   the control device driving, under control, the first modulating device in association with switching between the first light emitting device and the fifth light emitting device, and driving, under control, the third modulating device in association with switching between the third light emitting device and the fourth light emitting device.

5. A projector employing the light source according to claim 1.

* * * * *